United States Patent [19]

Jeannet et al.

[11] Patent Number: 4,604,808
[45] Date of Patent: Aug. 12, 1986

[54] INSTRUMENT FOR MEASURING LINEAR MAGNITUDES

[75] Inventors: Jean-Pierre Jeannet, Lausanne; Eric Zumbrunnen, Lutry; Roberto Cartisano, Renens, all of Switzerland

[73] Assignee: Tesa S.A., Renens, Switzerland

[21] Appl. No.: 726,333

[22] Filed: Apr. 22, 1985

[30] Foreign Application Priority Data

Apr. 26, 1984 [CH] Switzerland ............ 2047/84

[51] Int. Cl.⁴ ................................. G01B 5/02
[52] U.S. Cl. ................................. 33/143 M
[58] Field of Search ............ 33/143 R, 143 L, 143 K, 33/143 M, 143 J, 147 T, 147 J, 147 F, 158, 159, 160, 169 R, 170; 384/247, 260, 261, 265, 267; 308/3 R, 3 A

[56] References Cited

U.S. PATENT DOCUMENTS 3,101,550  8/1963  Helferich ............ 33/143 M

FOREIGN PATENT DOCUMENTS 362533   7/1962  Switzerland ............ 33/143 M
14309   of 1913  United Kingdom ............ 33/143 M
581285  10/1946  United Kingdom ............ 384/39

*Primary Examiner*—Harry N. Haroian
*Attorney, Agent, or Firm*—Anthony J. Casella; Gerald E. Hespos

[57] ABSTRACT

The instrument is a slide caliper with inner and outer feelers borne by a slideblock (3) and by a slider (6) which is mounted for sliding on the slideblock via a play take-up device (7).

That device comprises a base plate (10) having two symmetric end inclined planes (14) on which two shoes (11) are arranged. The base plate bears a central shoulder (16) pierced by a hole (17) in which there is engaged the stud (25) of a drive and locking screw. Two compression springs (12) are interposed between this shoulder and the two shoes in order to cause the latter to rise on the inclined planes.

This device automatically takes up the play formed by the sliding system. It is irreversible.

The shoes (11) are narrower than the base plate and means (22) are provided to avoid their rubbing against the walls of the slider.

5 Claims, 4 Drawing Figures

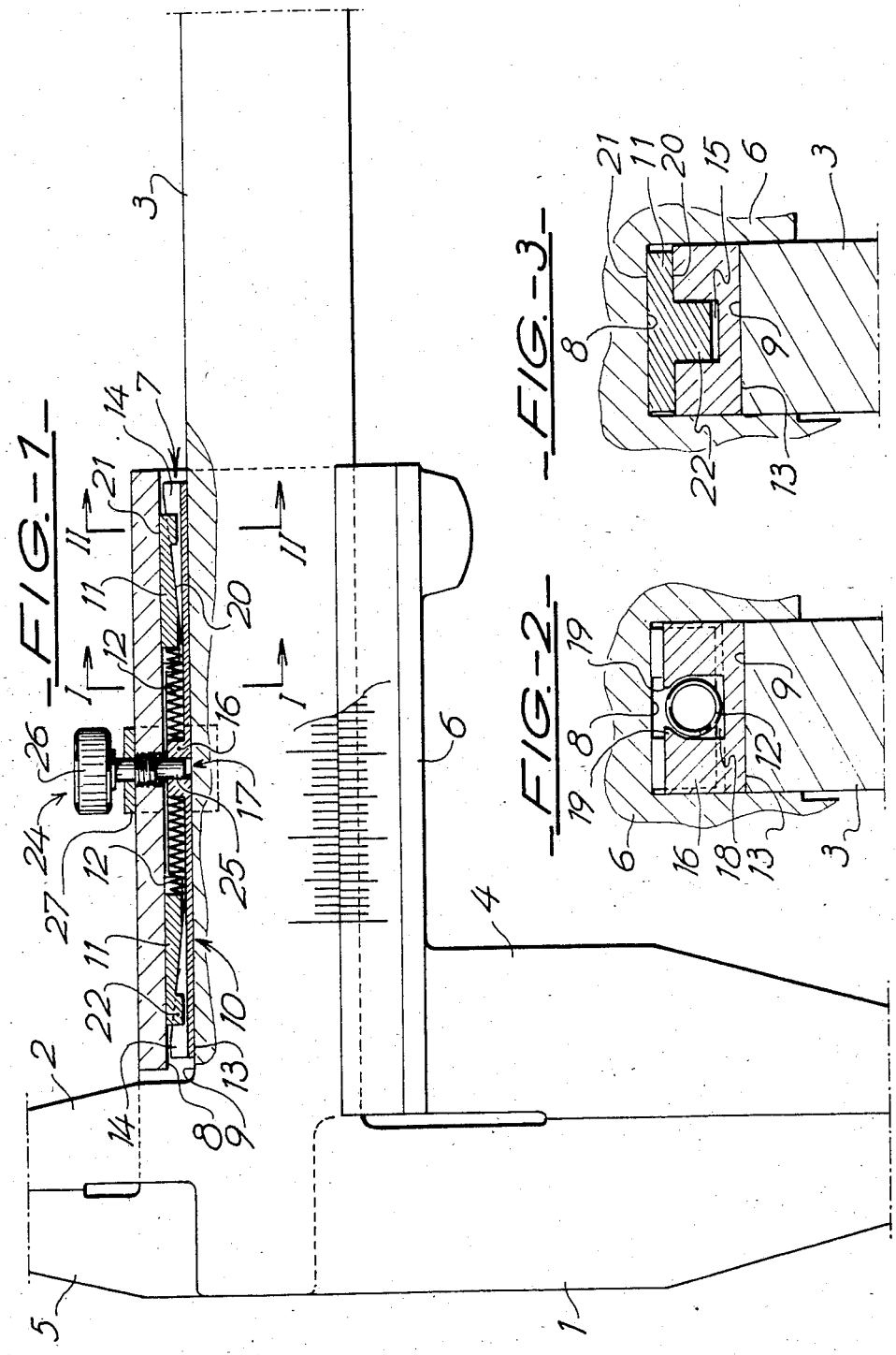

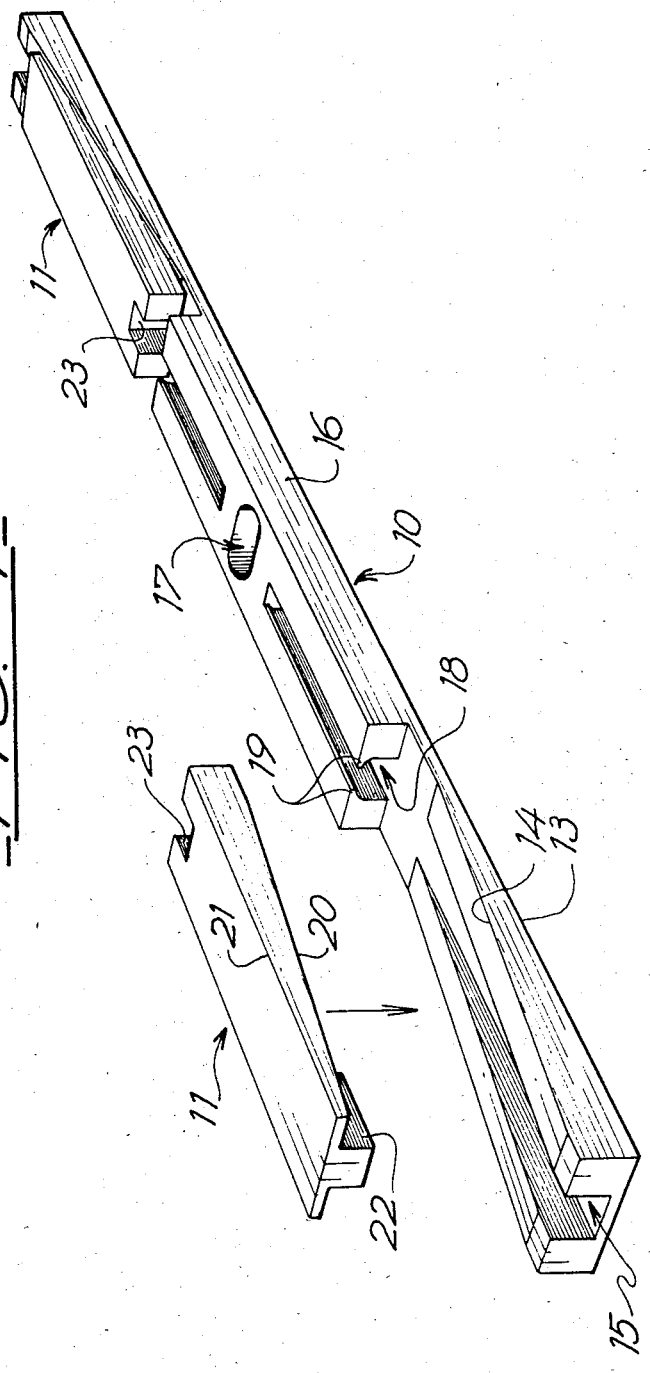

INSTRUMENT FOR MEASURING LINEAR MAGNITUDES

BACKGROUND OF THE INVENTION

The object of the present invention is an instrument for measuring linear magnitudes which comprises at least one feeler rigidly connected with a linear slideblock, at least one second feeler rigidly connected with a slider mounted for sliding on the slideblock, and at least one play take-up device connected to the slider and inserted between an inner resting face of the latter and a corresponding outer resting face of the slideblock within a space of rectangular cross section extending along the slider.

The play take-up device of the known instruments of this kind, such as, for instance, slide calipers and measurement columns are intended to compensate for the wear by friction caused by the displacements of the slider on the slideblock upon the taking of measurements.

This take-up of play is indispensable in order to assure precision of the measurement, since it avoids, upon the taking of a measurement by pressure of the feelers against the object to be measured, the tilting of the slider on the slideblock and thus distortion of the parallelism of the feelers, which would not fail to take place as a result of the offset of these feelers with respect to the slider and the slideblock.

Various types of play take-up devices are at present employed, depending on the degree of precision required.

Thus on certain medium-precision slide calipers, used, for instance, in locksmith shops, the play take-up device consists of a spring blade which is curved at its center and curved back and held at its two ends by the slider. The curved portion of this blade rests against an inner face of the slider and its two ends rest against a corresponding outer face of the slideblock. A set screw is engaged in a threaded hole in the slider and debouches on the inside onto the curved portion of the spring blade. This set screw makes it possible to change the pressure of the spring blade against the slideblock as desired and, at the end of the stroke, to lock the slider against the slideblock when it is desired, for instance, to retain the measurement after having freed the instrument from the part measured.

With this arrangement, the force of the spring blade is made sufficient to compensate for normal measurement pressure. However, there is still a doubt as to the precision of the measurement, since this pressure may accidentally be exceeded as, for instance, when making a difficult measurement in a narrow space, particularly when the spring blade has lost a part of its elasticity as a result of aging. In this case in fact nothing any longer prevents the slider from canting on the slideblock since the thickness of the spring blade is necessarily less than the height of the space which it occupies.

In another known type of play take-up device with leaf spring, applied to a measurement column having slightly offset feelers, the pressure of this blade is no longer applied directly at its ends to the slideblock but rather via a slide shoe of plastic material. The pressure of the spring blade is, in this case, distributed by the shoe in a more uniform manner, which constitutes an improvement. However, the aforesaid problems inherent in the use of a spring blade as play take-up means are still entirely present, despite the small offset of the measurement feelers.

On certain precision slide calipers used for the manufacture and inspection of parts in mechanical construction shops, the play take-up device consists of a thickness wedge of parallelpiped shape which is fitted for sliding in the space reserved for it between the slider and the slideblock. Two first set screws with heads countersunk in the slider are arranged resting against the two ends of the thickness wedge and are used for the periodic adjustment of the play take-up pressure. One of these two screws furthermore has a drive head engaged in a hole in the thickness wedge. The locking of the slider on the slideblock is assured, when desired, by a third set screw whose operating head rests against the central portion of the thickness wedge between the two screws with countersunk heads.

This device does not have the drawbacks of the preceding devices since, once the two screws with countersunk heads have been adjusted in such a manner as to eliminate the play between the thickness wedge and the slideblock, the slider can no longer cant under the effect of a strong measurement pressure. However, the use in shops of slide calipers equipped with devices of this type has shown a drawback inherent in the use of screws as take-up means. They can in fact loosen, without the operator noting this, as a result of vibrations caused, for instance, by the frame or an operating machine part on which the caliper has been temporarily placed. Furthermore, this device requires periodic adjustments of the two countersunk-head set screws as wear by friction between the thickness wedge and the slideblock takes place, in the absence of which the precision of the measurement would change with the passage of time.

SUMMARY OF THE INVENTION

The object of the present invention is to increase the reliability of the play take-up device of measurement instruments of the type mentioned at the beginning hereof.

For this purpose, the instrument for measuring linear magnitudes according to the present invention is characterized by the fact that its play take-up device comprises a base plate having a flat sliding surface on top of which there are two symmetric end inclined resting planes of the same slope, two shoes with inclined resting planes of the same slope as those of the base plate arranged resting respectively against the latter and having the flat slide surfaces parallel to the flat face of the base plate, and at least one elastic compression member arranged resting tangentially against each of the two shoes so as to cause the latter to rise along the two symmetric inclined planes of the base plate.

In this way, this play take-up device, once mounted and inserted between the slider and the slideblock of the measuring instrument autonomously by itself assures the taking up of the play formed by wear of the sliding system as said wear develops, by displacement of the shoes on the inclined planes of the base plate. As a result, it does not require periodic verification or action. It is not sensitive to vibrations and the wedge effect obtained by the combination of the two shoes and the base plate with symmetric slopes can be easily modulated in concept in order to withstand possible excess measurement pressures.

Other possibilities afforded by this basic structure, as well as their advantages, will become clearly evident from the following description.

BRIEF DESCRIPTION OF THE DRAWINGS

The accompanying drawings show by way of example, one embodiment of the object of the invention.

FIG. 1 is a partial overall view thereof in partial section.

FIG. 2 is a section along the section line I—I of FIG. 1.

FIG. 3 is a section along the section line II—II of FIG. 2.

FIG. 4 is a perspective view of a part of the component elements of its play take-up device.

DETAILED DESCRIPTION OF THE PREFERRED EMBODIMENT

The measuring instrument shown in FIG. 1 is a slide caliper comprising a first external feeler 1 and a first internal feeler 2 which are rigidly attached to a linear slideblock 3 of rectangular cross section and a second external feeler 4 and a second internal feeler 5 of a slider 6 which is mounted for sliding on the slideblock 3 via a play take up device 7. The slideblock and the slider are graduated and constitute the ruler and vernier of this instrument. These are traditional caliper shapes and constructions, with the exception, however, of the play take-up device 7 which characterizes it and which can be applied without difficulty to all measurement instruments based on a sliding system the play of which is to be taken up.

This play take-up device 7, the details of which are shown on a larger scale in FIGS. 2, 3 and 4, is inserted between the an inner bearing face 8 of the slider 6 and a corresponding outer bearing face 9 of the slideblock 3, within a space of rectangular cross section. It is formed of a baseplate 10, two shoes 11, and two compression springs 12.

The base plate 10 has a flat slide face 13, which here rests against the face 9 of the slideblock, on top of which there are two symmetrical inclined resting planes 14 of the same slope, each of them separated into two parts by a longitudinal groove 15. The highest portions of these two inclined planes are located at the two ends of the base plate and are of a thickness less than the height of the space between slider and slideblock. The central portion of this base plate 10 has a longitudinal shoulder16 which is of the same thickness as the end of the inclined planes 14 and is pierced by a vertical central hole 17 and by two longitudinal grooves 18 which are symmetrical with respect to said hole and face the two grooves 15 of the two inclined planes, and each of said longitudinal grooves having two small longitudinal retaining edges 19.

Each of the two shoes 11 has an inclined bearing plane 20 of the same slope as those of the base plate, which plane rests on one of said latter shoes, and a flat slide face 21 parallel to that of the base plate, placed here against the inner resting face 8 of the slider. Each of these two shoes 11 has under its thinner end a guide part 22 which engages in the corresponding groove 15 of the base plate and, at its other end, a notch 23 facing the corresponding groove 18 of the shoulder 16 of the base plate. The width of the two shoes 11 is here less than the width of the base plate 10, as is clearly visible, in particular, in FIG. 3.

Each of the two compression springs 12 rests on the one side against the end of a groove 18 of the shoulder 16 and on the other side against the end of the notch 23 of the corresponding shoe 11.

Once mounted and put in place, this play take-up device is connected for drive in translation to the slider 6 by means of a screw 24 engaged in a threaded hole in the slider and having an end stud 25 which engages in the central hole 17 in the shoulder of the base plate 10.

This screw 24 has an additional function here. It comprises an adjustment head 26 which, by manual screwing, makes it possible to lock the slider on the slideblock by the pressure of its end stud 25 against the latter when this is deemed necessary. A retaining claw 27 screwed down on the slider, prevents said screw from escaping by accidental unscrewing.

This screw 24 has no effect on the operation itself of the play take-up device; if the locking of the slider is not desired, it can be eliminated and its drive function obtained by some other means such as, for instance, a simple finger engaged in the central hole 17 or else two end stops which are rigidly attached to the slider. In this latter case with two end stops, the central hole of the base plate can be eliminated and the two grooves 18 of the shoulder 16 can debouch into each other so as to permit the use of a single compression spring resting at its two ends against the two shoes 11.

In this play take-up device, the operation of which has already been mentioned in the introduction, the combination of the longitudinal guide means of the two shoes 11 on the base plate 10, which means consist of the blocks 22 engaged in the grooves 15, with the difference in width of these two shoes as compared with the width of the base plate 10, has the result that these two shoes cannot cant with respect to the base plate nor rub against the side walls of the slider 6, as can be clearly noted from FIGS. 3 and 4. This is advantageous for the reliability of the system since these means assure it constancy in its operating characteristics by the elimination of all additonal random rubbings or deficiencies in parallelism between the slide faces of the shoes and the base plate. In a high precision measuring instrument this advantage is considerable.

On the other hand, for a measuring instrument of less precision, these features constituting this combination can be eliminated, either in whole or in part. In such case it is possible to contemplate a simple structure in which shoes 11 without blocks are placed directly on groove-less inclined planes 14 of a base plate 10. Furthermore, if the base plate 10 already has sufficient lateral play between the walls of the slider 6, the shoes 11 can be made of the same width as said base plate.

The guiding of the springs 12 in the grooves 18 of the base plate and the retention of them in the notches 23 of the shoes serves the same purpose as the advantages produced by the guidance of the shoes, since these features avoid any risk of the rubbing of these springs against the side walls of the slider 6. However, here also these guide and retention means can be eliminated in a simplified embodiment in which these springs are placed directly against a shoulder on the base plate and against the inner face of the shoes.

It is also possible to contemplate the replacement of the springs 12 by natural or synthetic elastic elements such as stops of rubber or of suitable plastic.

Of course, for each concept included within the scope of the invention, the slope of the inclined planes, the force of the springs or elastic members and the material used for the base plate and the shoes will be adapted to the desired operating conditions. In particular, the wedge effect which has already been mentioned will be modulated so as to obtain irreversibility of the sliding of the shoes on the base plate. Similarly, the geometrical shapes of the component parts of the play take-up device will be adapted to the possibilities of the shaping of the material used. The example described is particularly suitable for the production of the base plate and the two shoes by the molding of plastic material.

We claim:

1. An instrument for measuring linear magnitudes comprising at least a first feeler which is rigidly connected to a linear slideblock, at least one second feeler of a slider mounted for sliding on the slideblock and at least one play take-up device connected to the slider and inserted between an inner resting face (8) of the latter and a corresponding outer resting face (9) of the slideblock in a space of rectangular cross section, characterized by the fact that the play take-up device comprises a base plate (10) having a flat sliding face (13) over which there are two symmetrical end inclined resting planes (14) of the same slope, two shoes (11) with inclined resting planes (20) of the same slope as those of the base plate and arranged resting respectively against the latter and with flat sliding faces (21) parallel to the flat face of the base plate, and at least one elastic compression member (12) arranged resting tangentiallyagainst each of the two shoes so as to cause the latter to ascend along the two symmetric inclined planes of the base plate.

2. An instrument according to claim 1, characterized by the fact that the two inclined planes (14) of the base plate (10) are each separated in two by a longitudinal groove (15) and by the fact that each of the two shoes (11) has a guide block (22) engaged in said groove.

3. A measuring instrument according to claim 1, characterized by the fact that the two shoes (11) have a width which is less than the width of the base plate (10).

4. A measuring instrument according to claim 1, characterized by the fact that the base plate has a shoulder (16) which is located between its two inclined planes and has at least one longitudinal guide groove (18), by the fact that each shoe (11) has a notch (23) located facing said groove, and by the fact that the elastic compression member (12) is engaged in said groove and rests in said notch.

5. A measuring instrument according to claim 4, characterized by the fact that the shoulder (16) of the base plate has a vertical hole (17) intended for its connection to the slider (6) by means of a drive element (25) which is rigidly connected with the slider and engaged in said hole.

* * * * *